United States Patent
Hövel et al.

(10) Patent No.: US 9,901,983 B2
(45) Date of Patent: Feb. 27, 2018

(54) METHOD OF APPLYING MULTIPLE MATERIALS WITH SELECTIVE LASER MELTING ON A 3D ARTICLE

(75) Inventors: Simone Hövel, Ennetbaden (CH); Alexander Stankowski, Würenlingen (CH); Lukas Rickenbacher, Basel (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 551 days.

(21) Appl. No.: 12/915,920

(22) Filed: Oct. 29, 2010

(65) Prior Publication Data

US 2011/0106290 A1 May 5, 2011

Related U.S. Application Data

(60) Provisional application No. 61/256,382, filed on Oct. 30, 2009.

(51) Int. Cl.
*B23K 26/00* (2014.01)
*B22F 3/00* (2006.01)
(Continued)

(52) U.S. Cl.
CPC ............ *B22F 3/1055* (2013.01); *B22F 5/009* (2013.01); *B22F 5/04* (2013.01); *B22F 7/062* (2013.01);
(Continued)

(58) Field of Classification Search
CPC .... B22F 2998/00; B22F 3/1055; B23K 26/34; B23K 26/3206; B23K 35/0244
(Continued)

(56) References Cited

U.S. PATENT DOCUMENTS 3,952,180 A * 4/1976 Gnanamuthu ........... 219/121.65
3,970,319 A 7/1976 Carroll et al.
(Continued)

FOREIGN PATENT DOCUMENTS

EP 1231010 8/2002
EP 1273675 1/2003
(Continued)

OTHER PUBLICATIONS

Non-Final Office Action from co-pending U.S. Appl. No. 12/915,951 (dated Nov. 23, 2012).
(Continued)

*Primary Examiner* — Dana Ross
*Assistant Examiner* — Lawrence Samuels
(74) *Attorney, Agent, or Firm* — Buchanan Ingersoll & Rooney PC

(57) ABSTRACT

In a method for manufacturing an article (1), particularly a prototype of a product or component, a tool prototype or spare part, by using selected laser melting, for the application onto the article (1) of a layer (13) or portion of a second metallic material, which is different from the material of the first metallic powder (4), a tape (12), sheet (14), foil or three-dimensional pre-form (18) of a second material is applied to the article (1) and is heated by a focused laser or electron beam (6) to a specified temperature such that the tape (12), sheet (14), foil or pre-form, respectively, are made molten by the electron laser beam (6), wherein the focused beam (6) is applied to a given area corresponding to a selected cross-sectional area of the model of the article (1) under formation of a new layer or part made of second material integral with the article (1).

17 Claims, 2 Drawing Sheets

(51) Int. Cl.

| | | |
|---|---|---|
| *B22F 3/105* | (2006.01) | |
| *B22F 5/00* | (2006.01) | |
| *B22F 5/04* | (2006.01) | |
| *B22F 7/06* | (2006.01) | |
| *B22F 7/08* | (2006.01) | |

(52) U.S. Cl.
CPC ............ *B22F 7/08* (2013.01); *B22F 2999/00* (2013.01); *Y02P 10/295* (2015.11)

(58) Field of Classification Search
USPC ............ 219/121.16, 121.17, 121.65, 121.66; 416/223 R, 241 R; 29/889.7
See application file for complete search history.

(56) References Cited

U.S. PATENT DOCUMENTS

| | | | |
|---|---|---|---|
| 4,323,756 A * | 4/1982 | Brown et al. ............ 219/121.66 |
| 4,595,637 A | 6/1986 | Eaton et al. | |
| 4,772,773 A * | 9/1988 | Hashimoto et al. ..... 219/121.64 |
| 4,944,817 A * | 7/1990 | Bourell et al. ................ 264/497 |
| 4,968,383 A * | 11/1990 | Volkmann et al. ............. 216/65 |
| 5,038,014 A * | 8/1991 | Pratt et al. ............... 219/121.64 |
| 5,047,966 A | 9/1991 | Crow et al. | |
| 5,121,329 A * | 6/1992 | Crump .......................... 700/119 |
| 5,147,587 A * | 9/1992 | Marcus et al. ................ 264/434 |
| 5,207,371 A * | 5/1993 | Prinz et al. ................... 228/125 |
| 5,218,013 A | 6/1993 | Schock | |
| 5,269,057 A | 12/1993 | Mendham | |
| 5,354,414 A * | 10/1994 | Feygin ............................ 216/34 |
| 5,359,770 A * | 11/1994 | Brown et al. ................ 29/889.1 |
| 5,387,380 A * | 2/1995 | Cima ..................... B05C 19/04 264/109 |
| 5,622,474 A | 4/1997 | Werner et al. | |
| 5,768,134 A * | 6/1998 | Swaelens ........... A61C 13/0004 433/201.1 |
| 5,837,960 A * | 11/1998 | Lewis .................... B23K 26/34 219/121.63 |
| 5,876,550 A * | 3/1999 | Feygin et al. ................. 156/264 |
| 5,889,254 A * | 3/1999 | Jones ........................ 219/121.63 |
| 5,900,170 A * | 5/1999 | Marcin et al. ............ 219/121.66 |
| 5,902,498 A * | 5/1999 | Mistry et al. ............. 219/121.64 |
| 5,913,555 A | 6/1999 | Richter et al. | |
| 6,057,047 A | 5/2000 | Maloney | |
| 6,064,031 A * | 5/2000 | Talwar ...................... 219/121.64 |
| 6,144,008 A * | 11/2000 | Rabinovich ............. 219/121.64 |
| 6,146,476 A * | 11/2000 | Boyer ........................... 148/525 |
| 6,215,093 B1 * | 4/2001 | Meiners ................ B22F 3/1055 219/121.61 |
| 6,355,086 B2 * | 3/2002 | Brown et al. .................... 75/235 |
| 6,365,222 B1 | 4/2002 | Wagner et al. | |
| 6,457,629 B1 * | 10/2002 | White ......................... 228/112.1 |
| 6,457,939 B2 | 10/2002 | Ghasripoor et al. | |
| 6,508,000 B2 | 1/2003 | Burke et al. | |
| 6,526,327 B2 * | 2/2003 | Kar et al. ....................... 700/119 |
| 6,575,218 B1 * | 6/2003 | Burns et al. ................... 156/512 |
| 6,575,702 B2 * | 6/2003 | Jackson et al. ............. 416/96 R |
| 6,583,381 B1 * | 6/2003 | Duignan .................. 219/121.69 |
| 6,672,343 B1 | 1/2004 | Perret et al. | |
| 6,733,907 B2 | 5/2004 | Morrison et al. | |
| 6,797,914 B2 * | 9/2004 | Speranza et al. ........ 219/121.64 |
| 6,838,157 B2 | 1/2005 | Subramanian | |
| 6,861,613 B1 | 3/2005 | Meiners et al. | |
| 6,912,446 B2 | 6/2005 | Wang et al. | |
| 6,916,529 B2 | 7/2005 | Pabla et al. | |
| 7,001,672 B2 * | 2/2006 | Justin .................... A61C 8/0012 148/525 |
| 7,423,236 B2 | 9/2008 | Suh | |
| 7,479,328 B2 | 1/2009 | Roth-Fagaraseanu et al. | |
| 7,666,522 B2 * | 2/2010 | Justin .................... A61F 2/30767 148/525 |
| 7,841,834 B1 * | 11/2010 | Ryznic ........................... 416/224 |
| 2001/0014403 A1 | 8/2001 | Brown et al. | |
| 2002/0082741 A1 * | 6/2002 | Mazumder .......... A61F 2/30767 700/123 |
| 2003/0082048 A1 * | 5/2003 | Jackson et al. ............... 415/115 |
| 2003/0082297 A1 | 5/2003 | Wolkers et al. | |
| 2005/0038551 A1 * | 2/2005 | Mazumder et al. .......... 700/166 |
| 2005/0123785 A1 | 6/2005 | Sahoo et al. | |
| 2005/0164027 A1 | 7/2005 | Lau et al. | |
| 2005/0166397 A1 * | 8/2005 | Ng ................................ 29/889.1 |
| 2006/0163222 A1 * | 7/2006 | Dance .................... B23K 15/08 219/121.69 |
| 2007/0084047 A1 | 4/2007 | Lange et al. | |
| 2007/0141375 A1 | 6/2007 | Budinger et al. | |
| 2008/0173386 A1 * | 7/2008 | Clark ..................... B22F 3/1055 156/73.1 |
| 2008/0178994 A1 * | 7/2008 | Qi et al. ........................ 156/245 |
| 2008/0182017 A1 | 7/2008 | Singh et al. | |
| 2009/0148278 A1 | 6/2009 | Allen | |
| 2010/0151183 A1 | 6/2010 | Davis et al. | |
| 2011/0099809 A1 * | 5/2011 | Hovel et al. ..................... 29/888 |
| 2011/0099810 A1 * | 5/2011 | Stankowski ............ B22F 7/062 29/888 |

FOREIGN PATENT DOCUMENTS

| | | |
|---|---|---|
| EP | 10219983 | 12/2003 |
| EP | 1392957 | 3/2004 |
| EP | 1620225 | 2/2006 |
| EP | 1674192 | 6/2006 |
| EP | 1734146 | 12/2006 |
| EP | 1887107 | 2/2008 |
| EP | 1975271 | 10/2008 |
| GB | 2148755 | 6/1985 |
| WO | WO92/10343 | 6/1992 |
| WO | WO98/24574 | 6/1998 |
| WO | WO03/010419 | 2/2003 |
| WO | WO2008/046386 | 4/2008 |
| WO | WO2008/092461 | 8/2008 |
| WO | WO2008/155021 | 12/2008 |

OTHER PUBLICATIONS

Non-Final Office Action from co-pending U.S. Appl. No. 12/916,032 (dated Dec. 13, 2012).
U.S. Appl. No. 12/915,951, Hövel et al., filed Oct. 29, 2010.
U.S. Appl. No. 12/915,978, Duval et al., filed Oct. 29, 2010.
U.S. Appl. No. 12/916,032, Stankowski et al., filed Oct. 29, 2010.
European Search Report for EP Patent App. No. 10186339.7 (Feb. 23, 2011).
Final Office Action from co-pending U.S. Appl. No. 12/915,951 (dated Apr. 1, 2013).
Office Action dated Nov. 18, 2016, by the Canadian Intellectual Property Office in corresponding Canadian Patent Application No. 2,717,834. (8 pages).
Office Action dated May 4, 2016 by the Canadian Intellectual Property Office in corresponding Canadian Patent Application No. 2,717,834 (9 pages).
Office Action from co-pending U.S. Appl. No. 12/915,978 (dated Jul. 12, 2013).

* cited by examiner

METHOD OF APPLYING MULTIPLE MATERIALS WITH SELECTIVE LASER MELTING ON A 3D ARTICLE

This application claims priority under 35 U.S.C. § 119 to U.S. provisional patent application No. 61/256,382, filed 30 Oct. 2009, the entirety of which is incorporated by reference herein.

BACKGROUND

Field of Endeavor

The present invention relates to methods of applying multiple different materials with selective laser melting on a 3D article as well as to 3D articles, in particular turbine components and parts thereof.

Brief Description of the Related Art

Methods for manufacturing a molded body, e.g., a prototype of a product or component, a tool prototype or spare part, in accordance with three-dimensional CAD data of a model of a molded body, by depositing layers of a liquid material or a metallic material in powder form, have become increasingly popular and commercially important.

One of these methods is known as stereo lithography. In stereo lithography, a molded body to be manufactured is divided into individual layers and the data of the individual layers concerning the prototype to be manufactured are supplied to a manufacturing device. Such a manufacturing device consists of a liquid bath with a UV hardening liquid that a UV beam sweeps over according to the contours and fields of the prototype to be manufactured in order to harden the liquid. Then, this initial layer is lowered to a defined layer thickness in order to harden a second coating on to it in accordance with the established data. Layer by layer this process continues until the entire model or prototype is created. Thin pipe walls, hollow cavities or intertwined components can be manufactured in a manner that corresponds to the serial product. Depending on the degree of partitioning of the layers, that is, the thickness of each layer that is hardened, even curvatures can be built in detail, within the general process limits.

Further methods of building a prototype of sintered metallic material in powder form are known, also designated as direct metal laser sintering (DMLS), selective laser melting (SLM), or electron beam melting (EBM). Such a method is, e.g., described in WO 92/10343. According to the method described in WO 92/10343, in order to manufacture a component, a first layer of powder that can be sintered is deposited and the powder is sintered according to the layer areas of the part to be manufactured. Then, this method is repeated in a manner where each time a new layer is deposited on the previously sintered layer and where these layers correspond to the respective layers or cross-sectional areas of the component to be manufactured. Also, WO 98/24574 discloses a method in which several layers of the powder are successively deposited one on top of the other, whereby each layer of powder is heated to a specified temperature by a focused laser beam applied to a given area corresponding to a selected cross-sectional area of the model of the molded body, before deposition of the next layer. The laser beam is guided over each layer of powder in accordance with the CAD cross-sectional data of the selected cross-sectional area of the model in such a way that each layer of powder is fixed to the layer below.

DE 102 19 983 discloses a method for making metallic or non-metallic products by freeform laser sintering, in which the products are fabricated from powdery material on a substrate plate in vertically additive, layer-by-layer fashion by a computer-controlled laser beam. Here, in particular for solving problems with the use of such a method for the production of small parts, the method is characterized in that at least one support is fabricated between the substrate plate and the outer surface of the product, the support being connected via a predetermined breaking area with the outer surface of the product, wherein the predetermined breaking area is formed by reducing the strength of the support along the outer contour of the product.

WO 2008/155021 also relates to a method for producing a component based on three-dimensional data for the component which is characterized in that, to produce the component from at least two different materials in defined regions of each of the cross-sectional regions, a type of powder is applied corresponding to the material of the cross-sectional region and the applied powder of the powder layer is fused by energy radiation suitable for the powder type.

One of the problems associated with these methods is the delivery of the powder for the individual steps. Therefore, particular devices have been proposed to this end. U.S. Pat. No. 6,672,343, for example, discloses an apparatus for delivering powder onto a plane surface of a device for creating a three-dimensional part in a layer-by-layer fashion, in particular of a laser sintering machine. It includes a covering device which can be moved back and forth in a second direction perpendicular to a first direction by a drive between a lateral first position and a second position located on the opposite side. In at least one of the positions it can be filled with powder. In order to simplify the apparatus and improve its operation, the covering device includes a slit extending across the entire width and open at its top and its bottom as well as smoothening elements at the ends opposite of the surface. A store container is provided above the coveringdevice, the volume of the store container at each location across the entire width being at least equal to the volume of the slit cavity located underneath.

In order to treat the surface of direct metal laser sintered materials to improve corrosion resistance and reduce surface defects, U.S. Patent Application Publication No. 2007/141375 proposes a direct metal laser sintered material including a substrate formed from a laser sintering process, the substrate having at least one surface, and a cladding material brazed onto at least a portion of the surface.

Apart from prototype manufacturing, DMLS is also used for the production of engine parts. For example, U.S. Patent Application Publication No. 2001/014403 discloses a method and an apparatus for fabricating a component by a direct laser process. One form embodying principles of the present invention contemplates a gas turbine engine blade having an abrasive tip formed directly thereon. U.S. Pat. No. 6,861,613 also discloses a generative method of fabrication and an accompanying device with which components can be fabricated in a DMLS process, but this time from a combination of materials using different types of metal powders. The device includes a bottom surface with a lowerable building platform, a leveling mechanism for leveling a first material in a processing plane above the building platform, a laser beam source for emitting a laser beam, a processing unit with a focusing optical system for focusing the laser beam onto the processing plane and a positioning mechanism which can position the processing unit in any desired positions in a plane parallel to the processing plane above the component. Furthermore, the device is provided with a suction device for sectioning off the material from the processing plane and an introduction mechanism for a second material with which the latter is brought into the focal range of the laser beam. This device permits fabrication of components of any desired complexity and adapted to a certain function, in which individual regions can be made of a second, harder material to increase sturdiness or to improve wear-resistance.

3D articles manufactured with SLM process are conventionally built up on a platform in a movable powder bed. The state of the art process is to build up the 3D article by melting metal powder (first material) in a multiple layer arrangement using a laser beam. In order to apply a second material (different metal powder), the first material has to be removed completely with great efforts or the powder bed is contaminated. Possible methods and devices to locally remove previously deposited first material powder with a suction or blow-off device are expensive, slow and may not avoid powder contamination. Therefore the layer-wise powder SLM process can not efficiently be used for this task and a laser generating process such as DMD (Direct Metal Deposition)/LENS (Laser Engineered Net Shape) has to be integrated.

SUMMARY

One of numerous aspects of the present invention thus relates to an improved method to apply multiple materials with a selective laser melting (SLM), or an electron beam melting (EBM) process, optionally in combination with an ultrasonic welding process, on a 3D article without contamination of the powder bed.

Another aspect of the present invention includes a method to use foils/tapes/sheets instead of powder for a second and any additional material different from the previous (powder based) to be applied. These foils/tapes/sheets can be used, e.g., for the application of abrasive materials or hardface materials and can be applied on different sections/portions (e.g., on edges) of the 3D article. A different material can also be applied on contact faces to improve the heat transfer. An improvement of the welding quality can also be achieved.

Among other potential benefits, one important benefit is the avoidance of the powder bed contamination when using foils/tapes/sheets instead of different powder material for the application of a different material on specific sections/portions of the part to be manufactured. Thus, the expensive powder in the powder bed can be reused for another application on the same or a different part.

Correspondingly, yet another aspect of the present invention relates to a method for manufacturing an article, such as (but not limited to) a prototype of a product or component, a tool prototype or spare part, in accordance with three-dimensional CAD data of a model of a (molded) body. The article is produced by depositing layers of a first metallic powder material, whereby normally several layers of the first metallic powder are successively deposited one on top of the other, and whereby each layer of first metallic powder is heated to a specified temperature with a focused laser or electron beam applied to a given area corresponding to a selected cross-sectional area of the model of the article, before depositing the next layer. In the process, the beam is typically guided over each layer of powder in accordance with the CAD cross-sectional data of the selected cross-sectional area of the model in such a way that each layer of powder is fixed to the layer below. In order to allow the use of a different material for parts of the article it is proposed for the application onto the article of a layer or portion of a second metallic material, which is different from the material of the first metallic powder, to use a tape, sheet, foil, or three-dimensional pre-form of a second material (and not a powder) and to apply it to the article, heating it with a focused laser or electron beam (ultrasonic welding is also possible) to a specified temperature such that the tape, sheet, foil or pre-form, respectively, is at least partly, preferably essentially completely molten by the laser or electron beam. Normally in this process the focused beam is applied to a given area corresponding to a selected cross-sectional area of the model of the article under formation of a new layer or part made of second material integral with the article, this given area can, however, also be the complete area of the tape/sheet/foil/pre-form.

Correspondingly, therefore, according to a first preferred embodiment of the invention, the entire tape, sheet, foil or three-dimensional pre-form of a second material tape, sheet, foil or three-dimensional pre-form of a second material is heated to a specified temperature with the focused beam. Alternatively the focused laser beam is applied only to a restricted area of the second material tape, sheet, foil or three-dimensional pre-form corresponding to a selected cross-sectional area of the model of the article and subsequently the non irradiated parts of the second material tape, sheet, foil or three-dimensional pre-form are removed.

According to another preferred embodiment, the material of the first metallic powder is selected from the group of: nickel base alloy, cobalt base alloy, titanium base alloy, steel, and combinations thereof.

Preferably, the second material, which as stated above is different from the material of the first metallic powder, is selected from the group of: nickel base alloy, cobalt base alloy, titanium base alloy, steel, and combinations thereof.

The second material can also be an abradable material, preferably selected from the group of: ceramics, abradable metallic materials, and combinations or composite thereof.

On the other hand, the second material can also be an abrasive material selected from the group of ceramics, abrasive metallic materials, and combinations or composite thereof.

The second material may also include hardface material, preferably selected from the group of: boron nitride, chromium carbide, silicon carbide, and combinations or composites thereof.

For most preferred uses the tape or the sheet has a thickness in the range of 200 µm-1.5 mm, preferably in the range of 0.5-1.0 mm.

On the other hand, typically a foil used in this process has a thickness in the range of 20-200 µm, preferably in the range of 20-100 µm.

It should be noted that it is possible and in some cases advisable to combine sheets, foils and/or tapes, in one or several sequential steps of formation of second material portions, and it is also possible and even preferable for certain applications, to combine pre-forms with sheets, plates and/or foils in one or several sequential steps of formation of second material portions on the article.

According to yet another preferred embodiment of the proposed method, the step of application of a layer or portion of the second metallic material is carried out at least twice sequentially, by which a large second material layer thickness can be achieved.

It should be noted that combinations of the proposed steps are possible. This means that it is possible to combine several different types of materials in the step of using tapes and/or sheets and/or foils and/or pre-forms by selecting correspondingly different materials for the individual tapes/sheets/foils/pre-forms. It is also possible to, after the application of a second (or third, etc.) material using tapes/sheets/foils/pre-forms, to again apply portions or sections by using metallic powder, so it is possible to have embedded layers of the second material, of second and third material, etc., enclosed by portions of first material made by conventional selected laser melting methods using metallic powder.

According to yet another preferred embodiment of the invention, the layer or portion of second metallic material is applied on the article on flat and/or three-dimensionally structured (non-flat) contact faces and/or edges and/or within the article.

The second material can, for example, be applied to contact faces to increase the weld ability/brazeability and/or to facilitate a joint to another three-dimensional article, for example, to a single crystal or a directional solidified article.

One particular potential advantage of methods embodying principles of the present invention is not only the independence of a metallic powder bed, but also the fact that the three-dimensional shape of pre-forms used can be adapted and tailored. This adaptation is possible in the sense as to define a target outer shape of the article by providing a specifically three-dimensionally pre-form of the second material. On the other hand, the pre-form can be structured in a complementary manner to the contact face of the article at the place where the pre-form is to be applied. Also combinations of these two shapes, so a complementary adaptation to the outer form of the article prior to the application of the pre-form and a three-dimensional structure in the outer side to define the outer shape of the final article after the step of application the pre-form, is possible. This shows the tremendous versatility of methods in accordance with principles of the present invention.

To summarize, exemplary methods in accordance with the present invention apply multiple materials with selective laser melting (SLM) or an electron beam process on a 3D article without contamination of the powder bed, including at least one of the elements given below, preferably a combination thereof in particular, as outlined in somewhat more detail above.

- a 3D article is built by selective laser melting on a platform and/or a support structure;
- the 3D article is built up by melting metal powder (first material) in a multiple layer arrangement using a laser beam or electron beam;
- the first material is formed out of nickel base alloy or cobalt base alloy or titanium base alloy or steel;
- a second material is applied on a plane on the 3D article or on sections/portions;
- these sections can be within the 3D article or on edges, contact faces or other surfaces of the 3D article;
- a pre-form can be used for application of the second material, typically only on preferred areas, but not on the whole plane of the 3D article;
- different pre-form geometries can be applied on each other so that a stepwise assembly is build up;
- the second material can be applied within the base metal of the 3D article to create a layer different from the base metal with a thickness between 20 µm and 1.5 mm;
- different materials in any sequences can be applied, only limited by the function of the 3D article;
- the second material includes Ni- or Co-base alloys or Ti-alloys or steel, but is different from the first material;
- material on contact faces can be applied to increase the weldability/brazeability of the 3D article to another 3D article/to facilitate a joint between the 3D article and a single crystal or directional solidified article;
- the second material may include hardface materials such as boron nitride, chromium carbide, silicon carbide and others known in the art;
- the second material can be an abradable material such as ceramics, metallic, or composites;
- the second material can be an abrasive material such as ceramics, metallic, or composites;
- the second material can be a foil;
- the foil is made molten by using the laser or electron beam;
- the thickness of the foil is between 20 µm and 200 µm, preferably between 20 µm and 100 µm;
- the second material can be a tape;
- the tape is made molten by using the laser or electron beam;
- the thickness of the tape can be between 200 µm and 1.5 mm, preferably between 0.5 mm and 1.0 mm;
- the second material can be a sheet;
- the sheet is made molten by using the laser or electron beam;
- the thickness of the sheet is between 200 µm and 1.5 mm, preferably between 0.5 mm and 1.0 mm.

Advantages of the methods described herein include, for example:

- Application of multiple, different materials without contamination of the powder in the powder bed. The expensive powder can be reused.
- There is no need of process combinations and therefore, besides a handling device, no other process equipment is required.
- Cost reduction.
- Flexibility and productivity improved.
- Simplified handling.
- Increase of product functionality.

Furthermore, another aspect of the present invention relates to the use of a method as outlined above for the manufacturing and/or the repair and/or the surface coating of gas turbine parts, in particular of blades, vanes, and/or structural parts.

Last, but not least, yet another aspect of the present invention relates to gas turbine parts, in particular blades, vanes, and structural parts, made using a method as defined above, inclusive of gas turbine parts having parts and/or coatings and/or sections made using methods described herein.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DETAILED DESCRIPTION OF EXEMPLARY EMBODIMENTS

Figure 1:
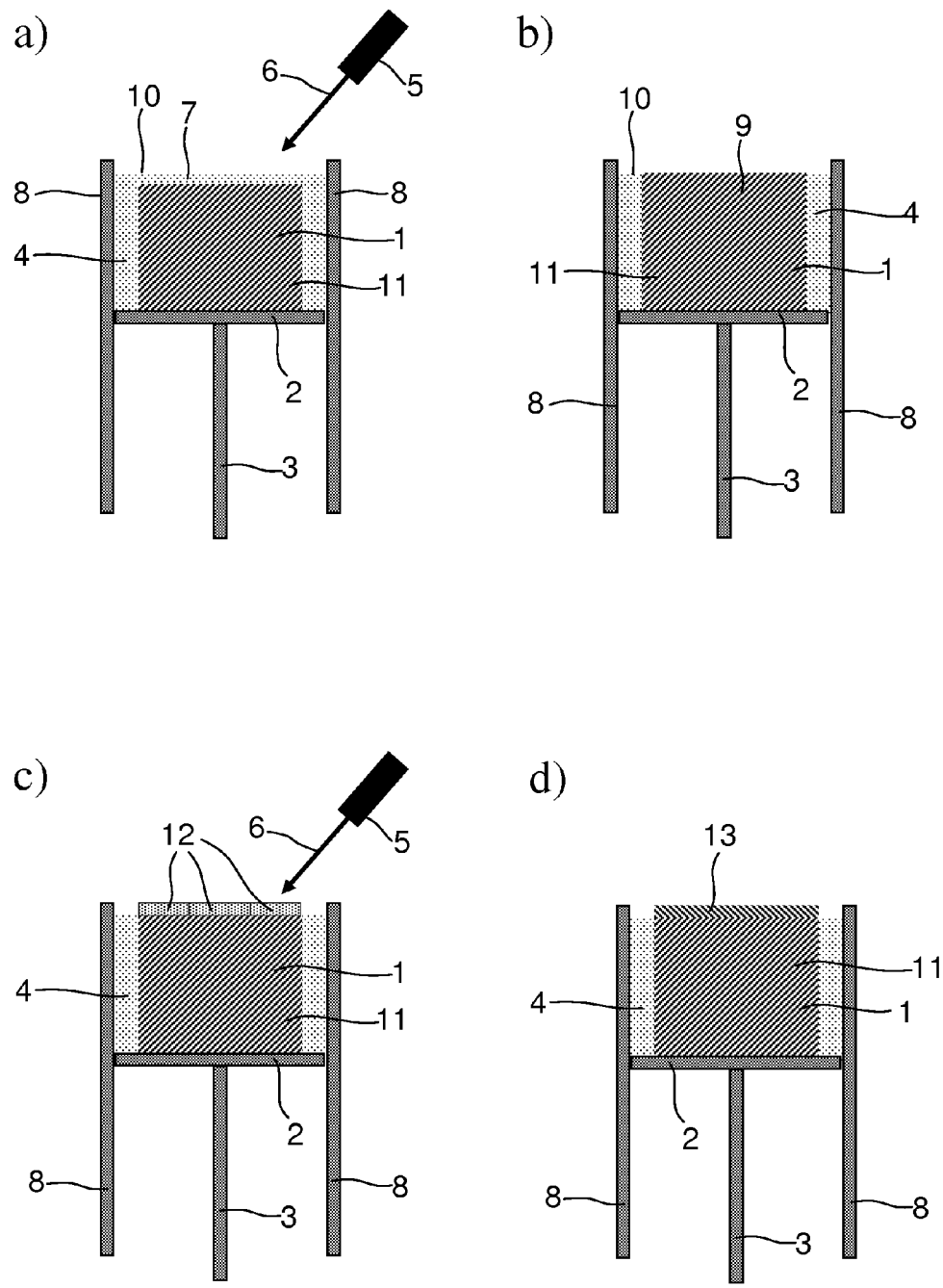
FIG. 1 shows, in a schematic representation, the individual steps of the formation of a three-dimensional article, wherein in a) the situation just before a selective laser melting step using a powder bed is shown, in b) the situation after the selective laser melting step is shown, in c) the situation after application of a tape of second material and in d) the situation after the formation of a layer of second material on the three-dimensional article is shown.

In FIG. 1 a sequence of the production steps using a method embodying principles of the present invention is shown. FIG. 1a schematically illustrates the basic set up of a metal powder based selective laser melting (SLM) or direct metal laser sintering (DMLS) or electron beam melting (EBM) process. In this process, according to the state of the art processes, an article with a three dimensional shape 1 is consecutively built up layer by layer in a metal powder bed 4.

The metal powder bed 4 is present in a cavity enclosed by side walls 8 in which typically a support platform 2, for example by a vertical bar 3, is mounted such as to be vertically displaceable. With respect to the general principles of such a process, reference is made to the disclosure of WO 92/10343 as well as to the one of WO 98/24574.

FIG. 1a shows the situation just prior to the deposition of yet another layer of material on a block of first material 11 already solidified by preceding laser melting steps. In the production process the three dimensional article (not yet finished) is placed such that its upper surface is covered by a thin metal powder layer 7 in the metal powder bed 4. The whole three dimensional article 1 is made of one single first material 11, which is basically the melt result of the metal powder being present in the metal powder bed 4.

Now a controllable laser head 5, the energy and motion of which is controlled by a computer and a corresponding motion control unit, is activated and irradiates a laser beam 6 onto those places where the metal powder present in the metal powder layer 7 is to be melted and to be attached/formed integrally with the three dimensional article 1. To this end the laser beam 6 is directed depending on corresponding model data over the surface in a certain pattern, optionally repetitively, until, what is illustrated in FIG. 1b, a next layer of first material 1 has been built up, this newly formed layer 9 being schematically illustrated by reference numeral 9. Since, however, this new layer is formed integrally with the previously existing part of article 1, in a well controlled process the layer 9 will hardly be distinguishable as a true layer. The height of this new layer 9 or part of the article 1 is typically smaller than the height of the metal powder layer 7 due to the melting of the material under irradiation with the laser 6.

One main disadvantage of these methods is the fact that only one single material can be used for the build-up of the article. If combinations with other types of material are envisaged, this either leads to a contamination of the metal powder bed 4, or is associated with a complicated and expensive removal of the powder bed and build-up of a new, different powder bed. These disadvantages can be overcome by methods embodying principles of the present invention.

As illustrated in FIG. 1c, a new layer of a second material different from the first material 11 is build up on a surface of the article 1 by attaching or just putting on top a tape 12 of a second material. This tape 12 can be pre-cut to the desired shape of the new layer of second material; it does not, however, have to be pre-cut. The tape can either be loosely laid on top of the article 1, or it may also be provisionally attached to a corresponding surface by using adhesives or mechanical fixation.

Once this layer of strips of tape 12 are put in place, again the laser 5 is activated and the laser beam 6, by locally melting the material of the tape 12 and moving along the surface, forms a new layer on top of the first material part 11 of the article 1. At the end of the process the situation is as illustrated in FIG. 1b, there is a new layer 13 formed on the surface of the first material 11, wherein this newly formed layer 13 of the three dimensional article is made of a second material different from the first material.

Figure 2:
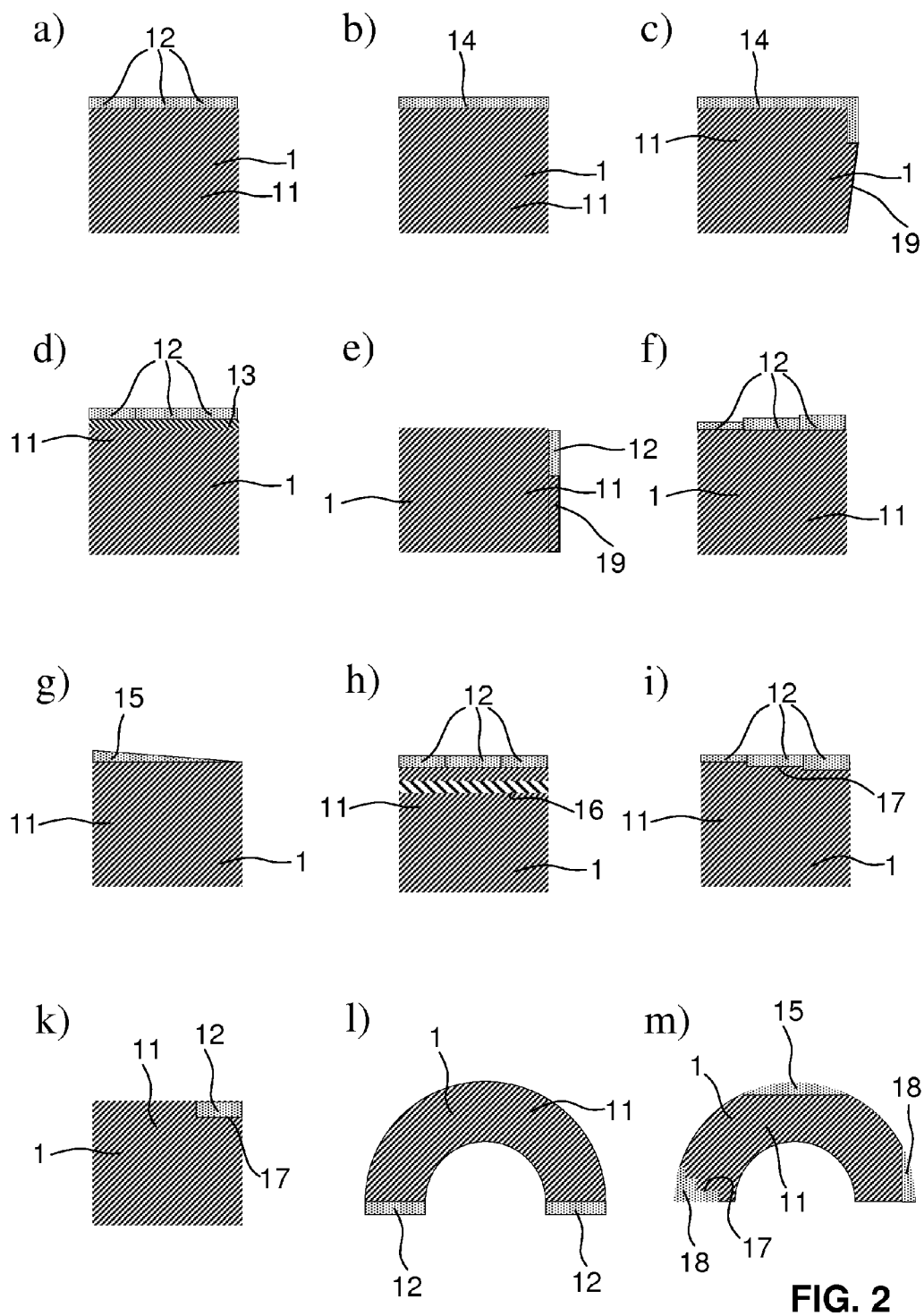
FIG. 2 shows, in a schematic representation, various possibilities made available using the proposed method, wherein in a) the use of tape of second material is illustrated as in FIG. 1, in b) the use of a sheet/foil of second material is illustrated, in c) the use of a sheet/foil of second material around a corner of the body of first material is shown; the section of the second material that is located on the side surface of the first material preferably rests on a support structure built from the first material, by gradually extending the side surface to yield the support, in d) the situation before the application of a second layer of second material for the build-up of a multilayer structure is illustrated, in e) the possibility of the formation of second material structures on side surfaces is illustrated; here, the second material on the side surface is supported by a support structure manufactured from the first material; the support structure may be detached from the article after completion of the manufacturing, in f) the possibility of structuring the surface by using second material tape of different thickness is illustrated, in g) the use of a three-dimensionally shaped sheet or foil is illustrated, in h) the possibility of several sequential steps of application of different materials is illustrated, in i) the possibility of using tape in situations where there is a three-dimensionally structured surface on the body of first material is shown, in k) as in i) but with a different surface topology of the body of first material, in l) the possibility of applying second material on complex bodies of first material is illustrated, and in m) the possibility of using pre-forms of second material on a complex body of first material is illustrated.

Using the embodiments of FIG. 2 it shall be illustrated how versatile and useful the methods embodying principles of the present invention can be.

FIG. 2a shows essentially the set up as being the starting point of what is illustrated in FIG. 1c. Here strips of tape 12 are used for the formation of a layer or portion 13 of a second material and potentially further materials different from the first material generated in the powder bed.

According to another embodiment, not tape but an actual foil or sheet of second material is used. In case of a sheet 14, as illustrated in FIG. 2b, the sheet typically has a thickness in the range of 200 micrometers to 1.5 millimeter. For thinner structures, foils can be used with thicknesses in the range of 20 micrometer to 200 micrometer.

As illustrated with the help of FIG. 2c, one potential great advantage is also that in one step it is possible not only to provide a new layer on top of an existing body 1 of a first material 11, but it is also possible to, for example, cover edges by using either a standard foil or by using an actually pre-contoured pre-form around a corner, as illustrated in FIG. 2c. If the perform is such that the lateral part over the edge is held by the part lying on top of the body 1, no further support for the lateral part is necessary. If however the lateral part is not already joined to the horizontal part, the lateral part should be resting on a support structure 19 prior to its attachment to the body. The support structure 19 can be made of the same or another material 11 as the section 1. The support structure 19 may also be removed after fusion of the lateral part with the body 11

If a very thick layer of second material 13 has to be built up, it may in some cases be advisable to go through several steps of application of second material, which is illustrated in FIG. 2d, where in a preceding step a first layer 13 of second material already has been made using a process as illustrated in FIG. 1, and wherein in a yet other step again layers of tape 12 are attached to the new layer 13 and again fused to this layer 13 to form a thicker layer of second material in a process analogous to the one as illustrated in FIGS. 1c and 1d.

As already mentioned above, methods embodying principles of the present invention can also be used for applying a different material not only to top surfaces of the article but also to essentially any other surface portion of the article. As illustrated in FIG. 2e, it is, for example, possible to attach a strip or tape 12 to a side surface of the article 1 of first material 11 in order to form a lateral protrusion thereon, normally by supporting the second material tape 12 with a support structure 19. If this is done of course the powder bed should be lowered and should not remain at a level as illustrated in FIG. 1c. Again, the support structure 19 may also be removed after fusion of the lateral part with the body 11.

One additional possible advantage is the fact that, by particular tailoring of the second material elements, the final outer shape of the final three-dimensional article 1 can be determined by a corresponding choice of the second material elements. As for example illustrated in FIG. 2f, different layer thicknesses of the tape 12 can be used in order to result in a stepped final outer shape of the article 1.

In a similar manner a foil or sheet can be structured as illustrated in FIG. 2g, for example, on a horizontal surface plane of the article 1 made of a first material 11, a tilted slope of second material can be generated by providing a sheet which gradually gets thinner towards one side. Essentially any kind of grading is possible using correspondingly structured second material elements or pre-forms.

Another potential advantage is illustrated with the aid of FIG. 2h. Indeed multitudes of different materials can be deposited in a very convenient manner. As illustrated here, it is possible to have in the bottom part a first section of first material 11, then followed by a third material layer 16, which for example is generated using tapes or sheets. This can be done in the metal powder bed essentially as illustrated in FIG. 1c, and for the generation of another layer of first material on top of layer 16, it is sufficient to lower the support platform 2 and to fill again with metal powder and to solidify a subsequent layer of first material from the powder on top of layer 16. This can then be combined with yet another layer of a second material 12 by using, as illustrated in FIG. 2h, tape 12 which is put on top of the layer of first material.

The three-dimensional structuring possibilities of the proposed approach can also be used for compensating for a particular 3D structure in the first material surface. As illustrated in FIG. 2e in case of a top surface of the first material part 11 of the article 1 which is three-dimensionally structured as illustrated with reference numeral 17, it is possible to provide second material elements which are complementary structured to have an again flat horizontal top surface of the final article.

Indentations, grooves, gaps, holes and the like can also selectively be filled by providing corresponding inserts of second material as illustrated schematically by FIG. 2k. The three-dimensional articles can be complex shapes as illustrated with the aid of FIGS. 2l and 2m. In particular with reference to FIG. 2m, a pre-form 18 can essentially take any form which is necessary to, on the one hand, complement the shape of the surface 17 of the underlying part made of first material 11, but on the other hand, also to define the final three-dimensional outline of the final article 1. Essentially the shaping of a pre-form 18 is in most cases only limited by the availability of a support structure and the irradiation power of the laser which needs to be sufficiently high to allow for a complete bonding of the pre-form made of second material with the structure provided underneath made of first material. Due to the coating process in powder-based DMLS or EBM processes, the structures can only be built up on a layer-for-layer basis in these processes. Also the regions based on a second material should normally be built up on a layer-for-layer basis.

LIST OF REFERENCE SIGNS

1 Three-dimensional article
2 support platform
3 bar
4 metallic powder material, metal powder bed
5 controllable laser head
6 laser beam
7 metal powder layer
8 sidewalls of powder bed
9 newly formed layer
10 top level of metal powder bed
11 first material
12 tape of second material
13 newly formed layer of three-dimensional article made of second material
14 sheet/foil of second material
15 three-dimensionally structured sheet/foil of second material
16 layer of a third material within three-dimensional article
17 three-dimensionally structured surface area of three-dimensional article of first material
18 pre-form of second material
19 support structure for lateral attachment While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for manufacturing an article formed of at least a first metallic powder material and a second material, in accordance with three-dimensional CAD data of a model of the article, including CAD cross-sectional data of said model, the method comprising forming the article by:

depositing layers of the first metallic powder material, including successively depositing several layers of the first metallic powder material one on top of the other, and heating each layer of first metallic powder material to a specified temperature with a focused laser or electron beam applied to a given area corresponding to a selected cross-sectional area of the model, said heating performed before depositing a next layer, wherein said heating comprises guiding the beam over each layer of first metallic powder material in accordance with the CAD cross-sectional data of the selected cross-sectional area of the model so that each layer of powder is fixed to the layer below;

directly applying at least one tape, sheet or foil, of the second material to the first material of the article, the second material being different from the material of the first metallic powder and the at least one tape, sheet or foil having a varying thickness over at least one of a width or length of the at least one tape, sheet, or foil; and heating the second material with a focused laser or electron beam to a specified temperature such that the at least one tape, sheet or foil, is made molten by the laser or electron beam, wherein the focused beam is applied to a given area corresponding to a selected cross-sectional area of the model to form a new layer of second material on the article.

2. A method according to claim 1, wherein:
heating the at least one tape, sheet, or foil, comprises heating the entire at least one tape, sheet, or foil; or
heating the at least one tape, sheet, or foil comprises applying the focused laser or electron beam only to a restricted area of the second material at least one tape, sheet, or foil, corresponding to a selected cross-sectional area of the model of the article, and subsequently removing non-irradiated parts of the second material of at least one tape, sheet, or foil.

3. A method according to claim 1, wherein the second material comprises hardface material.

4. A method according to claim 1, wherein applying the at least one tape, sheet, or foil of a second material comprises applying a tape or a sheet having a thickness in the range of 200 μm-1.5 mm.

5. A method according to claim 1, wherein applying the at least one tape, sheet, or foil, of a second material comprises applying a tape or a sheet having a thickness in the range of 0.5-1.0 mm.

6. A method according to claim 1, wherein applying the at least one tape, sheet, or foil of a second material comprises applying a foil having a thickness in the range of 20-200 μm.

7. A method according to claim 1, wherein applying the at least one tape, sheet, or foil of a second material comprises applying a foil having a thickness in the range of 20-100 μm.

8. A method according to claim 1, wherein applying the at least one tape, sheet, or foil of a second material to the article comprises applying at least twice sequentially.

9. A method according to claim 1, wherein:
applying the at least one tape, sheet, or foil of a second material to the article comprises applying on the article on a flat contact face, on three-dimensionally structured contact faces, on edges, within the article, or combinations thereof; and
applying the at least one tape, sheet, or foil of a second material to the article comprises applying the second material to contact faces to increase the weld-ability, to facilitate joining to another three-dimensional article, or both.

10. A method according to claim 9, wherein the three-dimensional article comprises a single crystal or a directional solidified article.

11. A method according to claim 1, wherein the article is a gas turbine part.

12. A method according to claim 11, wherein the gas turbine part is a blade, a vane, or a structural turbine part.

13. A method according to claim 1, wherein the material of the first metallic powder is selected from the group consisting of nickel base alloy, cobalt base alloy, titanium base alloy, steel, and combinations thereof.

14. A method according to claim 1, wherein the second material is selected from the group consisting of nickel base alloy, cobalt base alloy, titanium base alloy, steel, and combinations thereof.

15. A method according to claim 1, wherein:
the second material is an abradable material selected from the group consisting of ceramics, abradable metallic materials, and combinations or composites thereof; or
the second material is an abrasive material selected from the group consisting of ceramics, abrasive metallic materials, and combinations or composite thereof; or both.

16. A method according to claim 3, wherein the hardface material is selected from the group consisting of boron nitride, chromium carbide, silicon carbide, and combinations or composites thereof.

17. A method for manufacturing an article formed of at least a first metallic powder material and a second material in accordance with three-dimensional CAD data of a model of the article, including CAD cross-sectional data of said model, the method comprising forming the article by:
depositing layers of the first metallic powder material, including successively depositing several layers of the first metallic powder material one on top of the other, and heating each layer of first metallic powder material to a specified temperature with a focused laser or electron beam applied to a given area corresponding to a selected cross-sectional area of the model, said heating performed before depositing a next layer, wherein said heating comprises guiding the beam over each layer of first metallic powder material in accordance with the CAD cross-sectional data of the selected cross-sectional area of the model so that each layer of powder is fixed to the layer below;

directly applying at least two tapes, sheets, or foils of the second material to the first metallic powder material of the article in a same layer, the second material being different from the material of the first metallic powder and at least one of the at least two tapes, sheets, or foils having a thickness of a width or length that varies from a thickness of a width or length of the other of the at least two tapes, sheets, or foils arranged in the same layer; and heating the second material with a focused laser or electron beam to a specified temperature such that the at least two tapes, sheets, or foils is made molten by the laser or electron beam, wherein the focused beam is applied to a given area corresponding to a selected cross-sectional area of the model to form a new layer of second material on the article.

* * * * *